(12) United States Patent
Marcantoni et al.

(10) Patent No.: US 8,991,589 B2
(45) Date of Patent: Mar. 31, 2015

(54) DEVICE FOR DETECTING MOVING CONTAINERS

(75) Inventors: Simone Marcantoni, Ponti sul Mincio (IT); Marco Bellini, Porto Mantovano (IT)

(73) Assignee: Makro Labelling S.R.L., Marmirolo (IT)

( * ) Notice: Subject to any disclaimer, the term of this patent is extended or adjusted under 35 U.S.C. 154(b) by 0 days.

(21) Appl. No.: 13/997,942

(22) PCT Filed: Nov. 30, 2011

(86) PCT No.: PCT/IB2011/055377
§ 371 (c)(1),
(2), (4) Date: Jun. 25, 2013

(87) PCT Pub. No.: WO2013/090093
PCT Pub. Date: Jul. 5, 2012

(65) Prior Publication Data
US 2013/0292230 A1   Nov. 7, 2013

(30) Foreign Application Priority Data
Dec. 27, 2010   (IT) .............................. VR2010A0253

(51) Int. Cl.
| B65C 9/06 | (2006.01) |
| B67B 3/26 | (2006.01) |
| B67C 3/00 | (2006.01) |
| B65G 43/00 | (2006.01) |

(52) U.S. Cl.
CPC ............... *B65G 43/00* (2013.01); *B65C 9/067* (2013.01); *B67B 3/26* (2013.01); *B67C 3/007* (2013.01)
USPC .................. 198/502.3; 198/469.1; 198/478.1; 198/572

(58) Field of Classification Search
USPC ............. 198/469.1, 478.1, 480.1, 502.3, 572, 198/575
See application file for complete search history.

(56) References Cited

U.S. PATENT DOCUMENTS

| 3,941,686 | A | * | 3/1976 | Juvinall | ......................... | 209/523 |
| 5,755,335 | A | * | 5/1998 | Michelotti et al. | ........... | 209/528 |
| 5,778,635 | A | * | 7/1998 | Galandrino | .................... | 53/306 |
| 5,810,955 | A | * | 9/1998 | Seifert et al. | ..................... | 156/64 |
| 5,941,109 | A | * | 8/1999 | Johnson et al. | ................ | 72/17.3 |
| 5,954,189 | A | * | 9/1999 | Averill | ........................ | 198/803.5 |
| 6,213,309 | B1 | * | 4/2001 | Dadisho | ........................ | 209/523 |
| 7,438,192 | B1 | * | 10/2008 | Kohler et al. | ................. | 209/523 |
| 7,497,323 | B2 | * | 3/2009 | Davidson et al. | .......... | 198/474.1 |
| 7,673,736 | B2 | * | 3/2010 | Kowalchuk | ............... | 198/478.1 |
| 8,627,945 | B2 | * | 1/2014 | Kramer et al. | ............. | 198/478.1 |

FOREIGN PATENT DOCUMENTS

| DE | 18 05 010 B1 | 4/1970 |
| EP | 0 635 452 A1 | 1/1995 |
| FR | 1 539 990 A | 9/1968 |

* cited by examiner

*Primary Examiner* — Douglas Hess
(74) *Attorney, Agent, or Firm* — Pearne & Gordon LLP

(57) ABSTRACT

Described is a device for detecting containers (2) moving along a feed path (A) of a conveyor (3), comprising a support structure (11) and at least one detection sensor (15) connected to the support structure (11) and mobile with respect to the support structure. The device (1) also comprises means (16) for synchronizing the sensor (15) with respect to the container (2), to move it in such a way that the sensor (15) follows the container (2) along at least one part of the feed path (A) from an initial position to a final position. Described is also a method for detecting containers (2) moving along a feed path (A) of a conveyor (3), comprising the operating steps of providing a sensor (15) and moving it from an initial position to a final position in a way which is synchronized with the movement of a container (2).

24 Claims, 9 Drawing Sheets

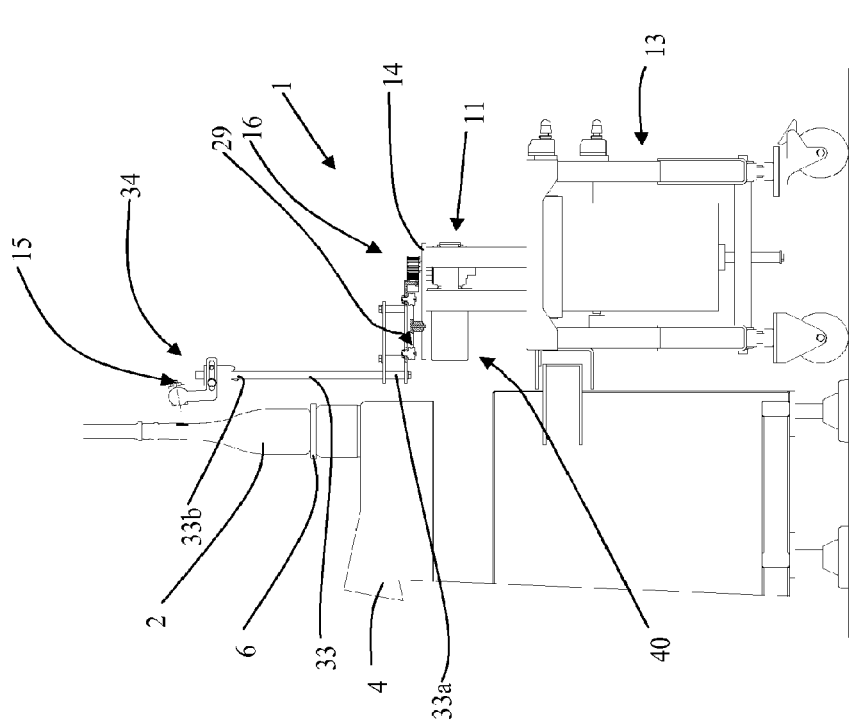
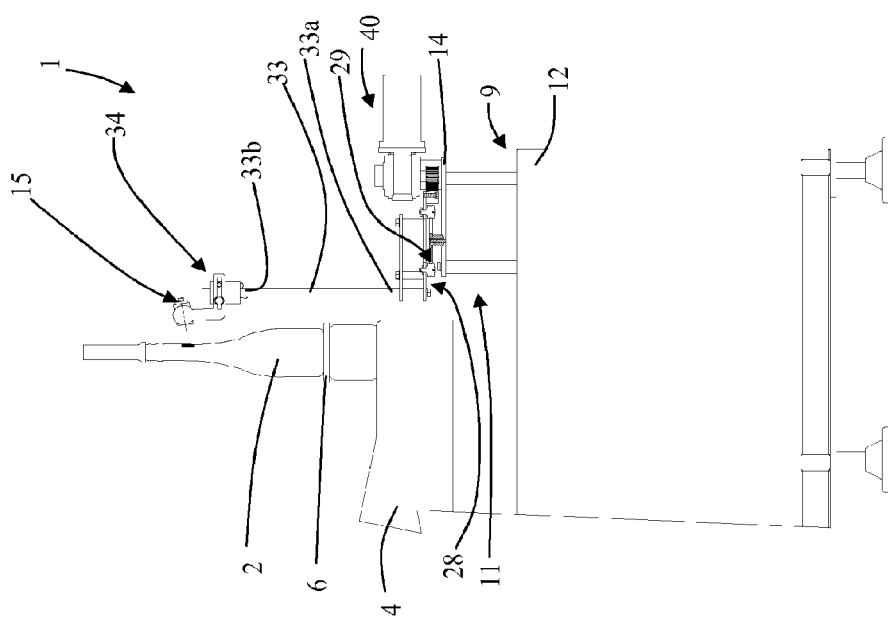

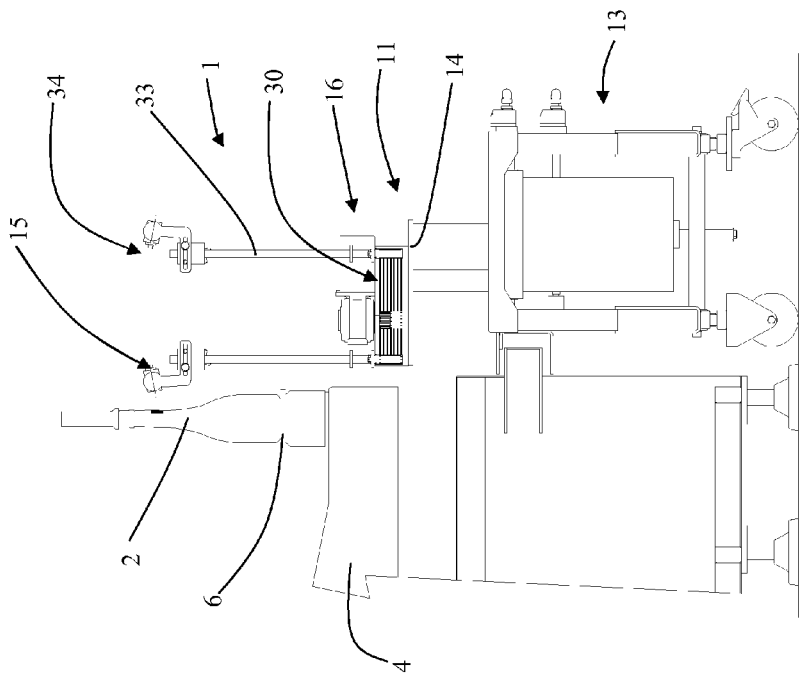
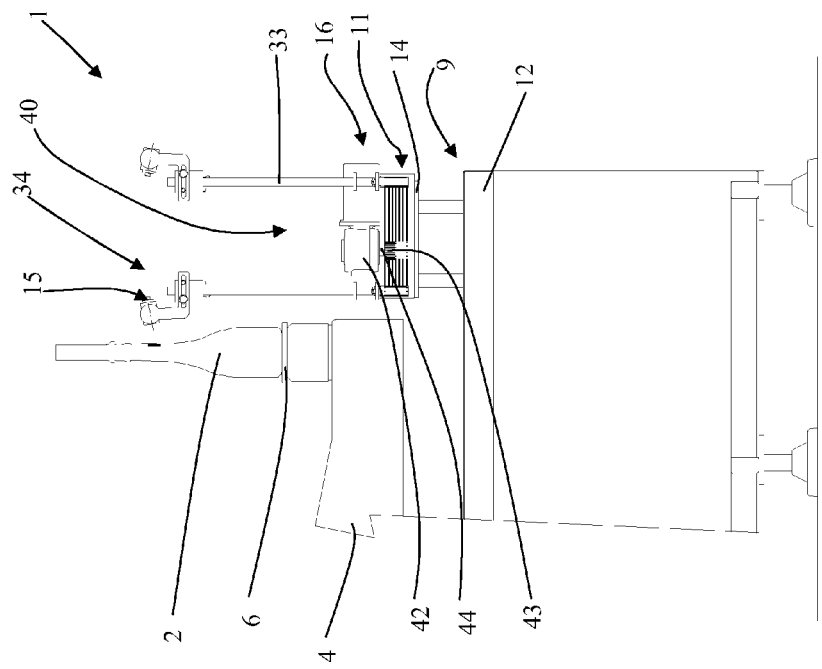

DEVICE FOR DETECTING MOVING CONTAINERS

TECHNICAL FIELD

This invention relates to a device for detecting containers moving along a feed path of a conveyor.

More specifically, the detection device is suitable for operating on bottles loaded on conveyors of the rotary carousel type. Normally, these rotary carousel conveyors comprise a plurality of rotatable plates, located along the periphery of the carousel, and on which the bottles are positioned (one bottle for each plate).

BACKGROUND ART

In general, in the bottle processing field, the bottles are loaded on a rotary carousel to which various processing stations, which operate on the bottles, are associated. These processing stations may be, for example, stations for applying labels, or filling stations, or stations for closing the bottles, etc.

According to the prior art, a plurality of sensors are mounted on the carousel, each located at a plate. More specifically, again according to the prior art, each sensor detects, during rotation of the bottle on the relative plate, a distinctive mark on the bottle (commonly know as "spot") which may be, if, for example, it is a glass bottle, the glass seam, a logo prepared on the glass (on which, for example, a label is to be applied), or yet other marks.

Once the sensor has detected the bottle "spot", a control unit connected to the sensor processes the signal and associates it with the corner in which the plate is positioned at that precise moment. In this way the orientation of the bottle on the plate is known and it is, for example, possible to apply a label at a desired position on the bottle.

Normally, each sensor is connected to the carousel (at a plate) using a bracket and it rotates integrally with the carousel so as to follow each bottle during rotation of the carousel.

Each bracket is normally connected to an upper part of the carousel and it extends mainly in a vertical direction towards the plates. In other words, the carousel normally has a plurality of vertical rods distributed along the perimeter of the carousel.

However, this prior art technique has several drawbacks.

More specifically, a first disadvantage is linked to the fact that the presence of a plurality of rods and a plurality of sensors further complicates the structure of the carousel and increases the dimensions of the carousel.

In addition, the presence of a plurality of brackets distributed around the carousel hinders access to the internal components of the carousel, such as when, for example, it is necessary to carry out the maintenance or replacement of components.

Moreover, a further drawback is linked to the fact that it is necessary to have as many sensors as there are plates of the carousel. Therefore, in the case of large carousels with many stations, it is necessary to have a large number of detection sensors. Consequently, the presence of many sensors increases the final cost of the carousel due both to the costs of the sensors themselves and the costs of the structures which support them.

DISCLOSURE OF THE INVENTION

In this situation the aim of this invention is to provide a device for detecting containers which overcomes the aforementioned drawbacks.

The aim of this invention is to provide a device for detecting containers which has reduced dimensions compared with the prior art.

The aim of this invention is also to provide a device for detecting containers which facilitates access to the inner zones of the conveyor on which it is installed.

The aims indicated are substantially achieved by a device for detecting containers as described in the appended claims.

BRIEF DESCRIPTION OF THE DRAWINGS

Further characteristic features and advantages of this invention will emerge more clearly from the detailed description of several preferred, but not exclusive embodiments of a device for detecting containers illustrated in the accompanying drawings, in which:

FIG. 7 shows a front view, with some parts in cross section, of a third embodiment of the device for detecting containers according to this invention applied to a carousel;

FIG. 8 shows a front view, with some parts in cross section, of a fourth embodiment of the device for detecting containers according to this invention applied to a carousel;

FIG. 12 shows a top view of a first variant of the fifth embodiment of the device illustrated in FIG. 9;

FIG. 13 shows a top view of a second variant of the fifth embodiment of the device illustrated in FIG. 9;

DETAILED DESCRIPTION OF THE PREFERRED EMBODIMENTS OF THE INVENTION

Figure 1:
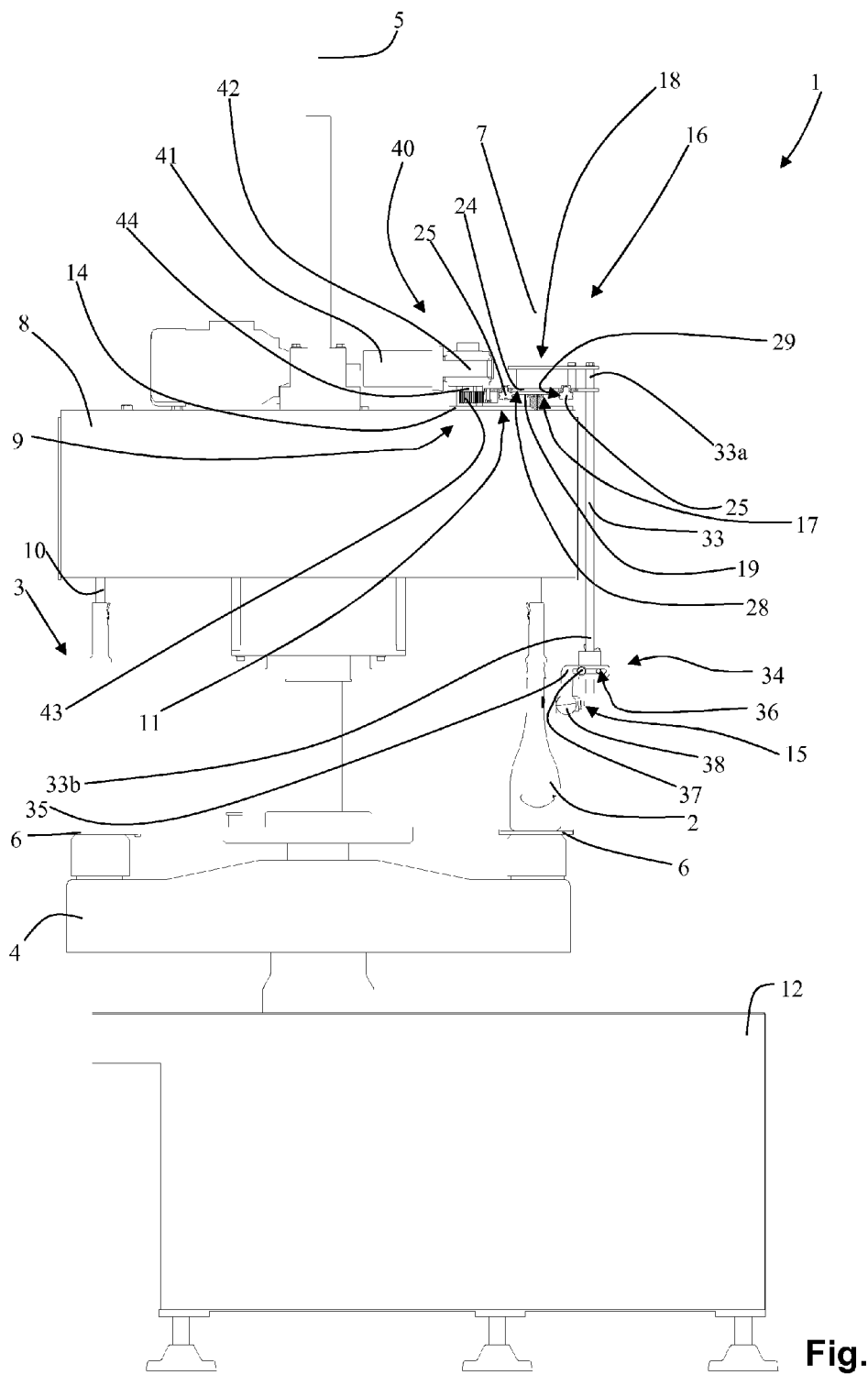
FIG. 1 shows a front view, with some parts in cross section, of a first embodiment of the device for detecting containers according to this invention applied to a carousel.

With reference to the said figures, the reference number 1 denotes overall a device for detecting containers 2, in particular bottles, moving along a feed path A of a conveyor 3.

The device 1 is operatively associated with a conveyor 3 which carries containers 2 along a feed path A.

Preferably, the device 1 according to this invention may be operatively associated with a rotary carousel conveyor 3. The rotary carousel conveyors 3 generally comprise a carousel 4 rotatable about an axis of rotation 5 of the carousel 4. Therefore, the rotating carousel 4 describes a feed circumference A with the centre passing through the axis of rotation 5. Moreover, the containers 2 are positioned along the periphery of the carousel 4.

More in detail, each container 2 is located in a predetermined position on a plate 6 (preferably circular in shape) rotatable about an axis of rotation 7 of the plate 6 parallel to the axis of rotation 5 of the carousel 4. The axis of rotation 7 of the plate 6 intersects the feed circumference A. In other words, during rotation of the carousel 4, the axis of rotation 7 of the plate 6 moves along the feed circumference A.

In addition, each plate 6 forms a supporting surface for a container 2. Furthermore, the plates 6 are located at a predetermined distance between each other, called the step of the carousel 4.

Moreover, the conveyor 3 comprises a supporting element 8 connected above the carousel 4 in which devices which operate on the containers 2 from above may be mounted. The supporting element 8 comprises still parts 9 relative to the rotation of the carousel and moving parts 10 integral with the rotating carousel 4.

In any event, the conveyors 3 with rotary carousels 4 are known in the sector for processing containers 2 and are not therefore described further.

The device 1 for detecting containers 2 according to this invention comprises a supporting structure 11 that can be associated with a conveyor 3 and, preferably, with a conveyor 3 with a rotary carousel 4.

More specifically, the support structure 11 is fixable to a stationary point relative to the carousel 4.

For example, in the embodiments illustrated in FIGS. 1 to 6 and 11, the support structure 11 is connected to a still part 9 of the supporting element 8.

Figure 14:
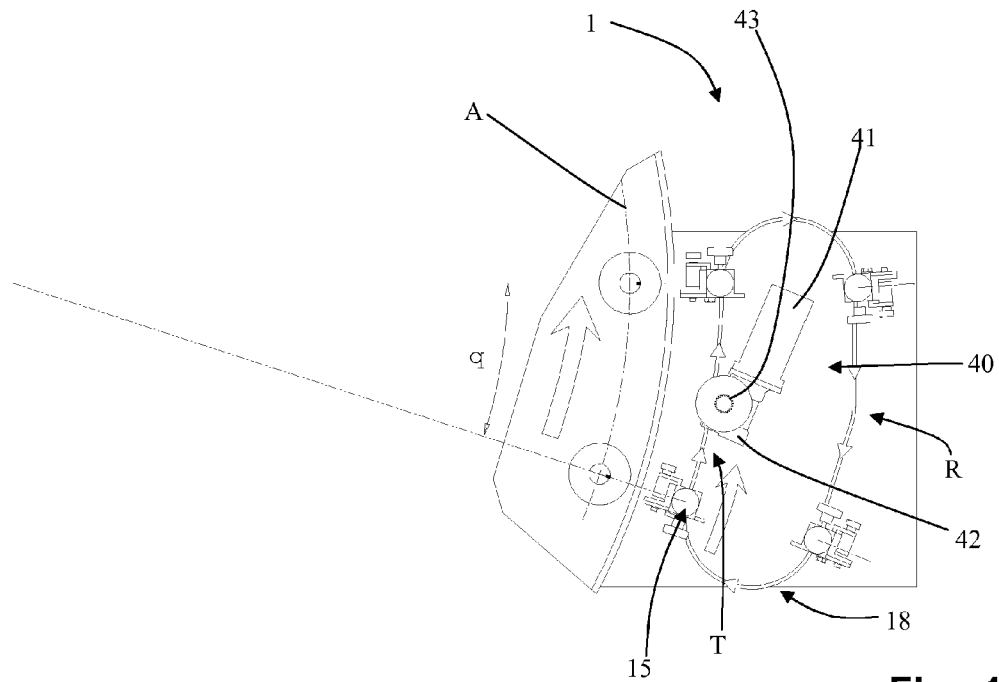
FIG. 14 shows a top view of the first variant of the fifth embodiment of the device illustrated in FIG. 12.

In the embodiments illustrated in FIGS. 7, 12 and 14, the support structure 11 is fixed on a support base 12 of the conveyor 3.

Figure 15:
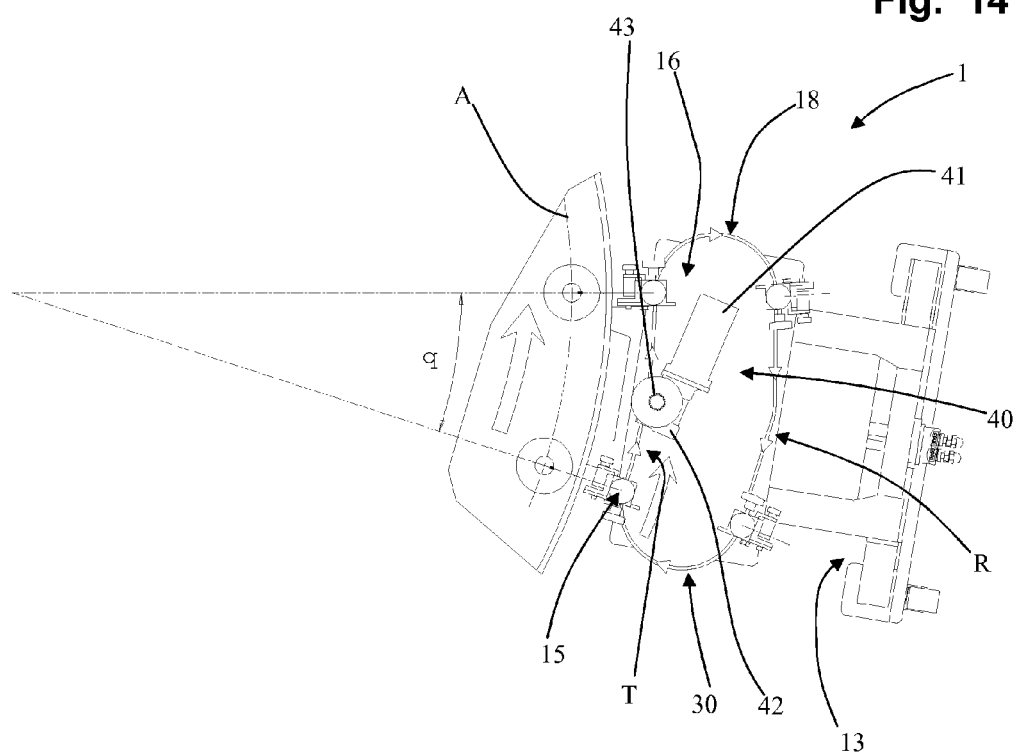
FIG. 15 shows a top view of the second variant of the fifth embodiment of the device illustrated in FIG. 9.

In the embodiments illustrated in FIGS. 8, 13 and 15, the device 1 comprises a trolley 13 fixable to the conveyor 3, on which the support structure 11 is mounted.

The support structure 11 of the device 1 preferably comprises a plate 14, which is the part of the support structure 11 fixable to the conveyor 3.

The device 1 according to this invention also comprises at least one detection sensor 15 connected to the support structure 11 and mobile with respect to the support structure. More specifically, the sensor 15 is operatively associated with a container 2 for detecting a characteristic of the container.

Moreover, the device 1 comprises means 16 for synchronising the sensor 15 with respect to the container 2. More specifically, the synchronising means 16 act on the sensor 15 for moving it so as to follow the container 2 along at least one part of the feed path A. Yet more specifically, the synchronising means 16 move the sensor 15 from an initial position (shown for example, in FIG. 2) to a final position (shown, for example, in FIG. 3).

More precisely, the synchronising means 16 move the sensor 15 at least between the initial position and the final position at a speed which is substantially equal to the feed speed of the containers 2.

Advantageously, the container 2 has carried out a rotation about itself of 360° from the initial position to the final position.

If the device 1 according to this invention is applied to a conveyor 3 with a rotary carousel 4, the tangential speed of the sensor 15, from the initial position to the final position, is substantially equal to the tangential speed of the carousel 4. In other words, from the initial position to the final position the sensor 15 is stationary relative to the carousel 4.

The synchronising means 16 comprise a guide 17, fixed to the support structure 11 (preferably by screws), and a mobile structure 18, on which the sensor 15 is fixed, slidably mounted on the guide 17.

In the embodiments illustrated in FIGS. 1 to 8 the guide 17 is a slide. More specifically, in these embodiments, the slide is a foil 19 having a main longitudinal extension from a respective first end 20 to a respective second end 21. Moreover, as may be seen as an example in FIG. 2, the foil 19 has an inner edge 22, facing the axis of the carousel 4, and an outer edge 23 opposite the inner edge 22. Preferably, the width of the foil 19 is substantially constant along its extension, so the distance between the outer edge 23 and the inner edge 22 is substantially the same along the entire extension of the foil 19.

As can be also seen in the embodiments illustrated in FIGS. 1 to 8, the mobile structure 18 is a runner which slides on the slide at least from the initial position to the final position. In that way, the sensor 15, being fixed to the mobile structure 18, also moves from the initial position to the final position.

In the embodiments illustrated in FIGS. 1 to 8, the runner in turn comprises a sliding portion 24 and a plurality of idle rollers 25 mounted on the sliding portion 24 so as to move at least from the initial position to the final position.

The sliding portion 24 is preferably flat and extends from a first part 26, close to the first end 20 of the foil 19, to a second part 27 close to the second end 21 of the foil 19. Preferably, the sliding portion 24 extends on a plane substantially parallel to the feed path of a container 2 on the conveyor 3. More specifically, in the preferred case wherein the conveyor 3 is of the rotary carousel type 4, the sliding portion 24 extends on a plane at right angles to the axis of rotation 5 of the carousel 4.

Moreover, the sliding portion 24 has a sliding face 28 directed towards the support structure 11. More specifically, the idle rollers 25 are mounted on the sliding face 28. Yet more specifically, each idle roller 25 is rotatable about a respective axis of rotation at right angles to the extension of the sliding portion 24. In addition, the axes of rotation of the idle rollers 25 are parallel to each other and, if the device 1 is applied to a conveyor 3 with a rotary carousel 4, the axes are substantially parallel to the axis of rotation 5 of the carousel 4.

Preferably, in the embodiments illustrated in FIGS. 1 to 8, the runner comprises four rollers 25 of which two first rollers 25 are spaced apart from each other and positioned close to the inner edge 22 of the foil 19. Another two second rollers 25 are spaced apart from each other and positioned close to the outer edge 23 of the foil 19.

In the embodiments illustrated in FIGS. 1 to 8, the foil 19 is positioned between the rollers 25 and in sliding contact with the rollers. More precisely, the inner edge 22 of the foil 19 is in sliding contact with two rollers 25, whilst the outer edge 23 of the foil 19 is in sliding contact with the other two rollers 25.

Advantageously, each roller 25 has a seat 29 having a circular extension for accommodating the foil 19 inside it. In other words, the orthogonal projection of the foil 19 on a horizontal plane overlaps the orthogonal projection of the rollers 25 on the same horizontal plane at the seat 29 of each roller.

In the embodiments illustrated in FIGS. 9 to 15, the mobile structure 18 comprises a closed-loop transmission unit 30 to which at least one sensor 15 is connected. Preferably, in this embodiment, the transmission unit 30 is a chain 31 or a closed-loop belt. As can also be seen in the embodiments illustrated in FIGS. 9 to 15, the guide 17 comprises a plurality of guide rollers 17 (not shown in the accompanying drawings) mounted and rotating on the support structure 11 and where the rollers are enveloped by the transmission unit 30. Preferably, the transmission unit 30 is a chain 31 and the guide rollers are toothed so as to engage with the chain 31 during movement of the latter. The guide rollers have axes of rotation substantially parallel to the axis of rotation of a carousel 4 to which the device 1 according to this invention is associated. Moreover, the guide 17 comprises a plurality of walls 32 positioned in contact with the transmission unit 30 for guiding it during its movement.

Moreover, in every embodiment illustrated in the accompanying drawings, the mobile structure 18 preferably comprises at least one rod 33 which extends between a respective first end 33a, connected to the rest of the mobile structure 18, and a respective second end 33b, close to a container 2 loaded on the conveyor 3. Advantageously, the sensor 15 is connected to the second end 33b of the rod 33. The rod 33 preferably has a main vertical extension as shown in the accompanying drawings.

More specifically, in the embodiments illustrated in FIGS. 1 to 6 and 11 the first end 33a of the rod 33 is at a height (measured from the ground) greater than the second end 33b, whilst in the other embodiments, the first end 33a of the rod 33 is at a height (measured from the ground) less than the second end 33b.

Moreover, the device 1 comprises adjustment means 34 interposed between the sensor 15 and the rod 33 which adjust the position of the sensor 15 relative to the rod 33. More specifically, in the embodiments illustrated in the accompanying drawings, the adjustment means 34 comprise a first adjustment unit and a second adjustment unit. The first adjustment unit adjusts the distance of the sensor 15 from the container 2, the second adjustment unit adjusts the inclination of the sensor 15 relative to the container 2.

Specifically, the first adjustment unit comprises a bar 35 having a slot 36 and at least one pin 37 connected to the rod 33 and slidably inserted in the slot 36. In this way, the bar 35 can slide relative to the pin 37 and, therefore, the rod 33. Moreover, the pin 37 can be screwed in the rod 33 so as to fix the bar 35 to the rod 33 once the bar 35 has been positioned correctly. In other words, the bar 35 is fastened between the rod 33 and a flat part of the pin 37.

The second adjustment unit comprises a rotatable coupling 38 mounted on the bar 35 so as to rotate the sensor 15 relative to the bar 35. In other words, the sensor 15 is connected to the rotatable coupling 38 which in turn, using the bar 35, is connected to the pin 37 and, therefore, to the rod 33.

Moreover, in every embodiment illustrated in the accompanying drawings, the guide 17, at least from the initial position to the final position, has the same shape as the feed path. Yet more specifically, the sensor 15 moves along a trajectory T which is equidistant at every point of the feed path (where the term "equidistant" refers to the minimum distance).

In more detail, in the preferred case wherein the device 1 is associated with a conveyor 3 with a rotary carousel 4, the feed path A is formed by a feed circumference A. Consequently, the trajectory T which the sensor 15 follows from the initial position to the final position is an arc formed on a circumferential movement arc M having the same centre as the circumferential feed arc A, but a different radius. In other words, the circumferential feed arc A and the circumferential movement arc M are concentric.

In the embodiments illustrated in FIGS. 1 to 8 the guide 17 has a circumferential arc shape. Consequently, the sensor 15 is mobile along a circumferential arc. More precisely, the foil 19 is arc shaped and the outer edges 23 and inner edges 22 of the foil 19 have profiles which follow the circumferential arcs formed on circumferences concentric with the circumferential feed arc A.

Moreover, in the embodiments illustrated in FIGS. 1 to 8, the synchronising means 16 move the sensor 15 from the initial position to the final position along the trajectory T. In addition, the synchronising means 16 move the sensor 15 from the final position to the initial position along the same trajectory T. In this way, the sensor 15 follows the container 2 from the initial position to the final position along the trajectory T and, after detecting the characteristic of interest of the container 2, the sensor 15 returns to the initial position along the trajectory T.

In the embodiments illustrated in FIGS. 9 to 15, the guide 17 comprises a main arc-shaped wall 39 which extends between a first respective end 39a and a second respective end 39b. Preferably, at least one guide roller is positioned at the first end 39a and the second end 39b of the main wall 39.

Advantageously, the main wall 39 extends at least from the initial position to the final position.

In this way, the transmission unit 30, being in contact with the main wall 39, takes the shape of an arc. In the embodiment illustrated in FIGS. 9 to 15, the synchronising means 16 also move the sensor 15 from the initial position to the final position along a forward trajectory T. In other words, the forward trajectory T corresponds to the trajectory T along which the sensor 15 moves in the case of the embodiments illustrated in FIGS. 1 to 8.

Moreover, in the embodiment illustrated in FIGS. 9 to 15, the synchronising means 16 move the sensor 15 from the final position to the initial position along a return trajectory R separate from the forward trajectory. In other words, the sensor 15 moves from the initial position to the final position along the forward trajectory T from the final position to the initial position along the return trajectory R.

Figure 4:
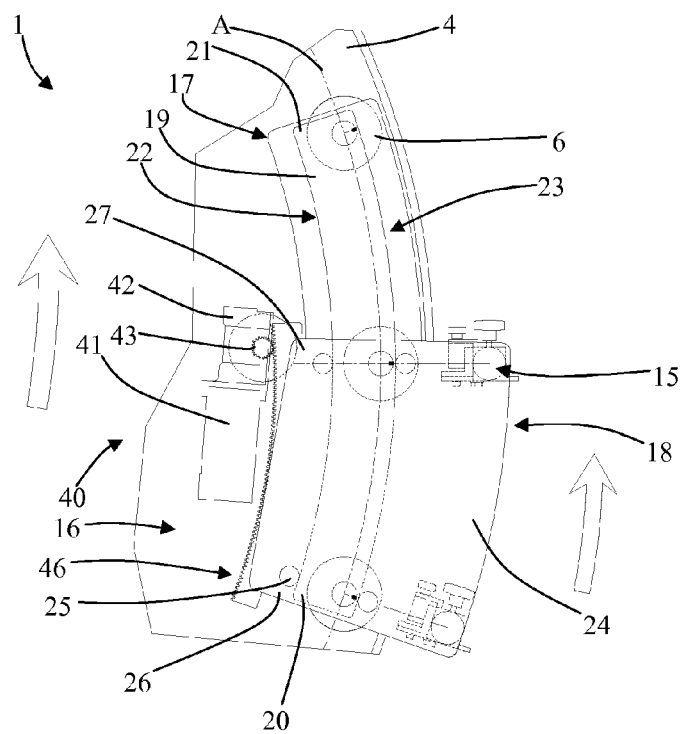
FIG. 4 shows a top view of a variant of the first embodiment of the device illustrated in FIG. 2 in the initial operating position.
Figure 5:
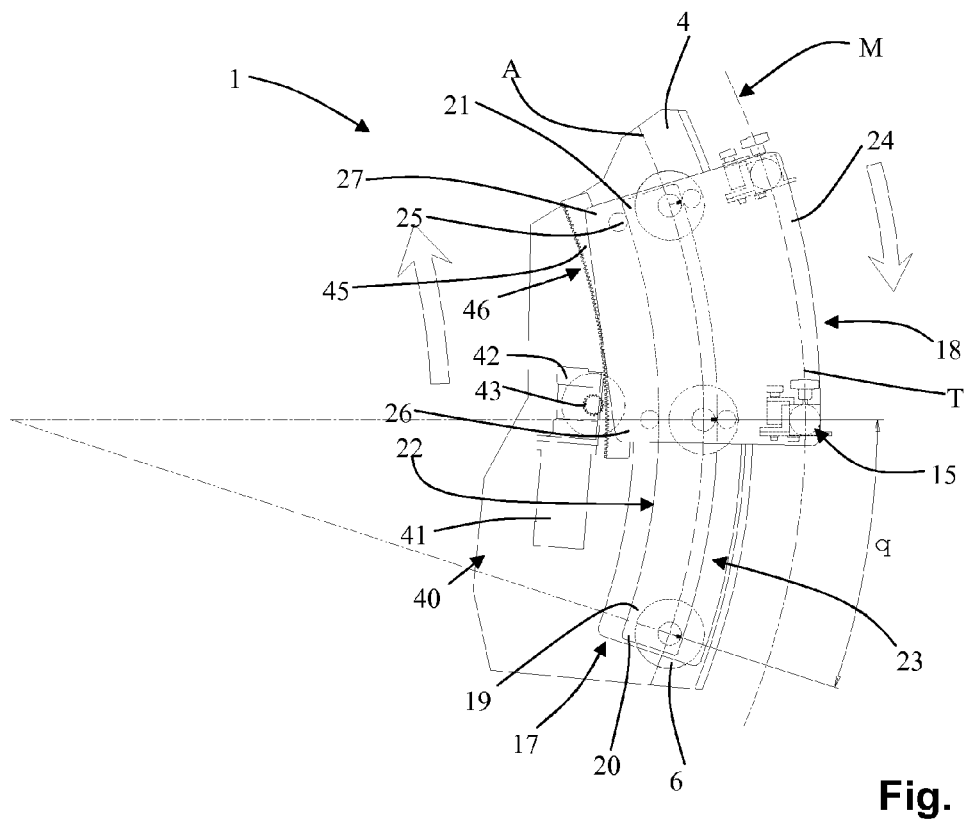
FIG. 5 shows a top view of the variant of the first embodiment of the device illustrated in FIG. 3 in the final operating position.

In the embodiments illustrated in FIGS. 4 and 5 and from 9 to 15, the device 1 comprises a plurality of sensors 15 spaced apart from each other on part of the feed path at the same distance from each other as the distance between one container 2 and another. More precisely, the sensors 15 are spaced along the trajectory T, in the case of the embodiment illustrated in FIGS. 4 and 5, or the sensors 15 are spaced along the forward trajectory T, in the case of the embodiment illustrated in FIGS. 9 to 15.

More in detail, each sensor 15 is connected to the chain 31 by a rod 33 of the type described previously. In yet further detail, the first end 33a of each rod 33 is fixed to the chain 31, whilst the second end 33b of each rod 33 protrudes from the chain 31.

Moreover, the device 1 comprises the adjustment means 34 described previously positioned at the second end 33b of the rod 33.

Moreover, the device 1 according to this invention comprises motor-driven means 40 for moving the mobile structure 18 with respect to the support structure 11. The motor-driven means 40 are preferably connected to the support structure 11 and preferably comprise an electric motor 41 with a rotatable rotor. The device 1 further comprises transmission means for transmitting the drive from the motor-driven means 40 to the mobile structure 18.

More specifically, the transmission means comprise a reduction gear unit 42 and a rotatable gear 43. The reduction gear unit 42 is directly connected to the motor 41 so as to transmit the drive from the rotor to a shaft 44 of the reduction gear unit 42 having an extension substantially parallel to the axis of rotation 5 of the carousel 4.

In the embodiments illustrated in FIGS. 1 to 8, the transmission means comprise a rack gear 45 on which the motor-driven means 40 are operative. More specifically, the rotatable gear 43 is operative on the rack gear 45.

The rack gear 45 is preferably connected to the mobile structure 18 at the sliding portion 24. More specifically, the rack gear 45 has a toothed profile 46, directed towards the axis of rotation 5 of the carousel 4, having a plurality of teeth.

Preferably, the toothed profile 46 has an extension according to a circumferential arc having as the centre the centre of the feed circumference A. The arc is therefore formed on a circumference concentric with the circumferential feed arc A.

In this way, during use, the motor 41 rotates, using the reduction gear unit 42, the rotary gear which, acting on the rack 45, moves the mobile structure 18 along the circumferential arc. In other words, if the rotor of the motor 41 rotates in one direction, the mobile structure 18 moves from the first end 20 of the foil 19 towards the second end 21 of the foil, and if the rotor of the motor 41 rotates in the direction opposite to the first direction the mobile structure 18 moves from a position close to the second end 21 of the foil 19 towards the first end 20 of the foil 19.

In yet other words, the mobile structure 18 carries the sensor 15 from the initial position, wherein the first part 26 of the sliding portion 24 is close to the first end 20 of the foil 19, to a final position wherein the second part 27 of the sliding portion 24 is close to the second end 21 of the foil 19.

Moreover, the distance between the first end 20 of the foil 19 and the second end 21 of the foil 19 defines the maximum stroke of the mobile structure 18. The stroke extends preferably on the circumferential feed arc A for an angle q.

Correspondingly, the sensor 15 moving from the initial position to the final position describes the angle q. Therefore, the movement of the sensor 15 has a dimensional impact on the conveyor 3 proportional to the angle q. Consequently, the movement of the rod 33 associated with the respective sensor 15 also has a dimensional impact on the conveyor 3 proportional to the angle q.

In other words, the size of the movement of the sensor 15 on the carousel 4 corresponds with a circumferential movement arc M having a length equal to the product between the angle q (expressed in degrees) and the measurement of the circumferential movement arc M, all divided by 360°.

It should be noted that the device 1 with a single sensor 15 (as shown in FIGS. 1 to 3 and 6 to 8) may be applied to conveyors 3 wherein the time taken by a container 2 to rotate about itself by 360° is less than the time taken by the conveyor 3 to carry a container 2 from the first position to the second position. In other words, the device 1 may be applied to conveyors 3 wherein the distance between one container 2 and the next is greater than the distance between the first position and the second position.

The device 1 according to this invention also comprises a control unit operatively associated with the sensor 15 and which may be operatively associated with the conveyor 3 for estimating the orientation of the container 2. The control unit processes a signal deriving from the rotation of a plate 6 of the conveyor 3 on which the container 2 is positioned and a signal deriving from the sensor 15 for estimating the orientation of the container 2.

More specifically, when a container 2 passes near the first position, the control unit commands the motor-driven means 40 to move the mobile structure 18, and, therefore, the sensor 15 (which is in the first position), in synchrony with the carousel 4.

During movement of the carousel 4 the plate 6 rotates about its axis making the loaded container 2 rotate on it. The control unit is operatively connected to the plate 6 so as to detect the angular position of the plate 6 during its rotation.

When the sensor 15 detects the characteristic ("spot") of the container 2, the control unit stores the angular position of the plate 6 in its own storage unit. The orientation of the container 2 is then known and, in particular, the point or the points in which the "spot" is present.

Once the sensor 15 has reached the final position, the control unit commands the sensor 15 to return to the initial position and await arrival of the next container 2.

The mobile structure 18 then moves from the final position to the initial position in the opposite direction to the feed direction of the carousel 4.

Preferably, the angle q between the initial position and the final position is greater than or equal to the product of the time necessary for the container 2 to make a complete turn about itself and the angular speed of the carousel 4.

In the case of the embodiments illustrated in FIGS. 4 and 5, there are two sensors 15 and there is a first sensor 15 in a first initial position and a second sensor 15 in a second initial position. Advantageously, the first sensor 15 is positioned at a first container 2, whilst the second sensor 15 is positioned at a second container 2 consecutive to the first on the carousel 4.

When the first container 2 reaches close to the first sensor 15 and correspondingly the second container 2 reaches close to the second container 15, the control unit commands the mobile structure 18 to move in synchrony with the carousel 4.

When each container 2 has rotated about itself by 360°, the first sensor 15 is in a first final position and the second sensor 15 is in a second final position.

Advantageously, the presence of two or more sensors 15 allows the device to be applied also to conveyors 3 wherein the time taken by a container 2 to rotate about itself by 360° is greater than the time taken by the conveyor 3 to carry a container 2 from the first position to the second position. In other words, the device 1 may be applied to conveyors 3 wherein the distance between one container 2 and the next is less than the distance between the first position and the second position.

In the preferred embodiment wherein the device 1 is applied to conveyors 3 with rotary carousels 4, the presence of two or more sensors 15 allows the device 1 to be applied also to carousels 4 wherein the angle q is greater than the angle between two containers 2 relative to the circumference M.

The presence of two sensors 15 allows the device 1 to simultaneously carry out the detection of the characteristics of two separate containers 2. More specifically, in the time in which the first sensor 15 detects a characteristic of a container 2, the second sensor 15 detects a characteristics of another container 2.

Preferably, the first sensor 15 is mounted on the plate in a position spaced from the second sensor 15. The distance between the two sensors 15 corresponds to the distance between two bottles on the conveyor 3.

In addition, in FIGS. 4 and 5 the maximum stroke of the mobile structure 18 is twice the maximum stroke of the mobile structure 18 in the case of a single sensor 15.

In the embodiment illustrated in FIGS. 9 to 15, the control unit acts on the motor 41 and synchronises the movement of the chain 31 with that of the carousel 4.

More specifically, the tangential speed of a sensor 15 from the initial position to the final position is substantially equal to the tangential speed of the carousel 4.

When the first sensor 15 reaches the final position a second sensor 15 is in a position close to the initial position. In this situation, the speed of the second sensor 15 from a position close to the initial position to the initial position may be more or less than the tangential speed of the conveyor 3.

Advantageously, in this way it is possible to use a chain 31 wherein the sensors 15 are located at a predetermined distance from each other on different types of conveyors 3 having different intervals (distance between the containers 2).

It is sufficient to synchronise the movement of the sensors 15 with the movement of the relative conveyor 3 in such a way that the sensor 15 reaches the initial position when a container 2 reaches the same initial position.

Advantageously, the support structure 11 of the device 1 according to this invention is positioned at a side of the conveyor 3. Preferably, the support structure 11 is positioned only at one side of the conveyor 3. In this way, the device 1 reduces the impact of the overall dimensions on the conveyor 3.

More specifically, in the case of the embodiment shown, for example, in

Figure 2:
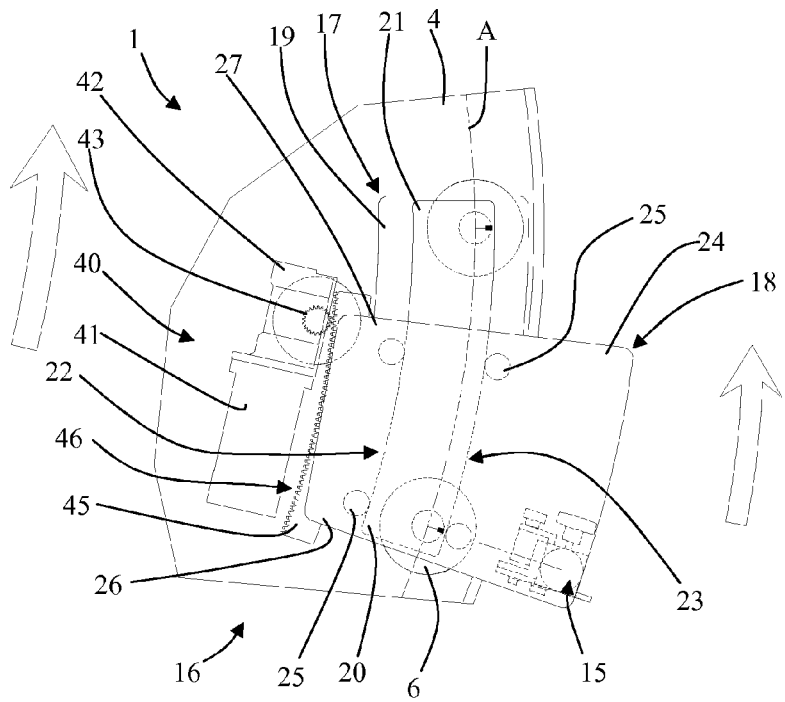
FIG. 2 shows a top view of the device illustrated in FIG. 1 in an initial operating position.
Figure 3:
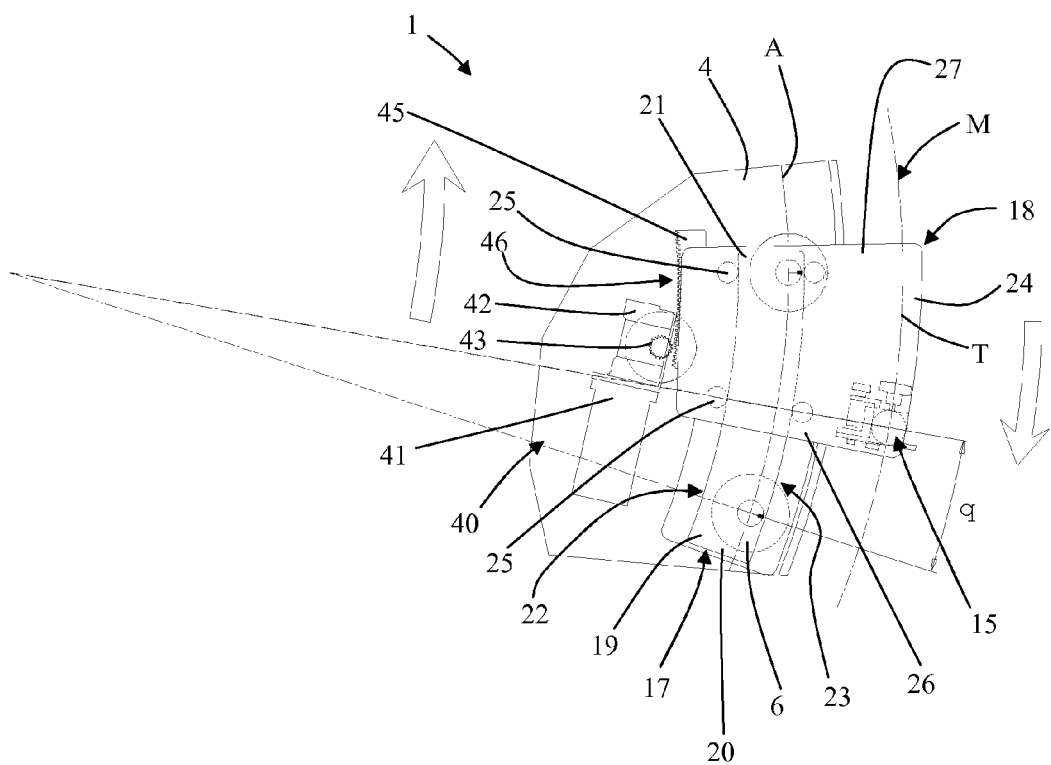
FIG. 3 shows a top view of the device illustrated in FIG. 2 in a final operating position.

FIGS. 2 and 3, the device 1 extends along a circumferential feed arc A between one container 2 and the next container 2. Yet more specifically, in the embodiment shown in FIGS. 4 and 5, the device 1 extends along a circumferential feed arc A between three consecutive containers 2 positioned on the conveyor 3.

In the embodiment shown in FIGS. 1, 7 and 8 and from 11 to 13, the mobile structure 18 extends mainly outside the outer edge of the conveyor 3. Preferably, the mobile structure 18 extends outside the outer edge of the carousel 4.

Figure 6:
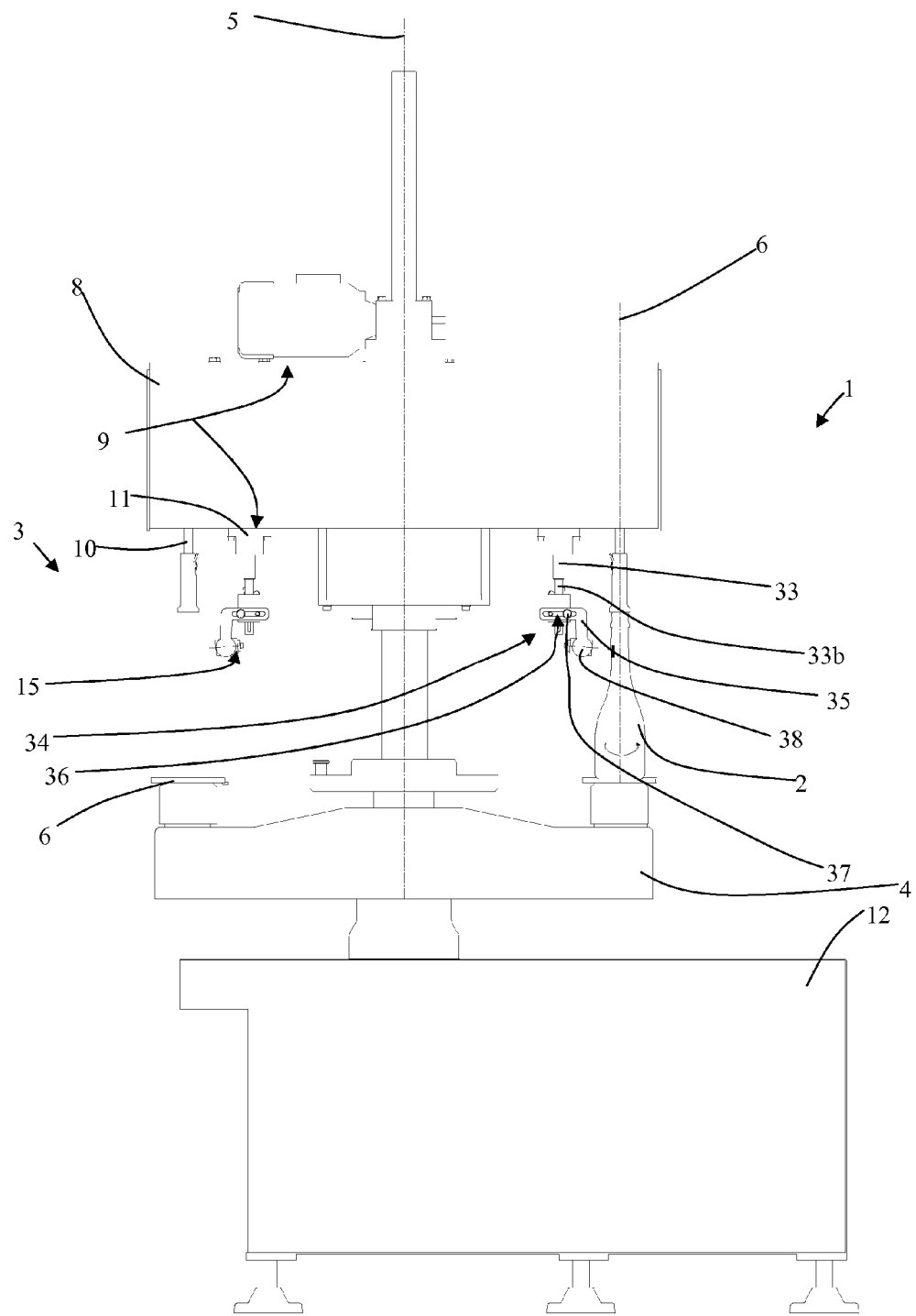
FIG. 6 shows a front view of a second embodiment of the device for detecting containers according to this invention applied to a carousel.
Figure 9:
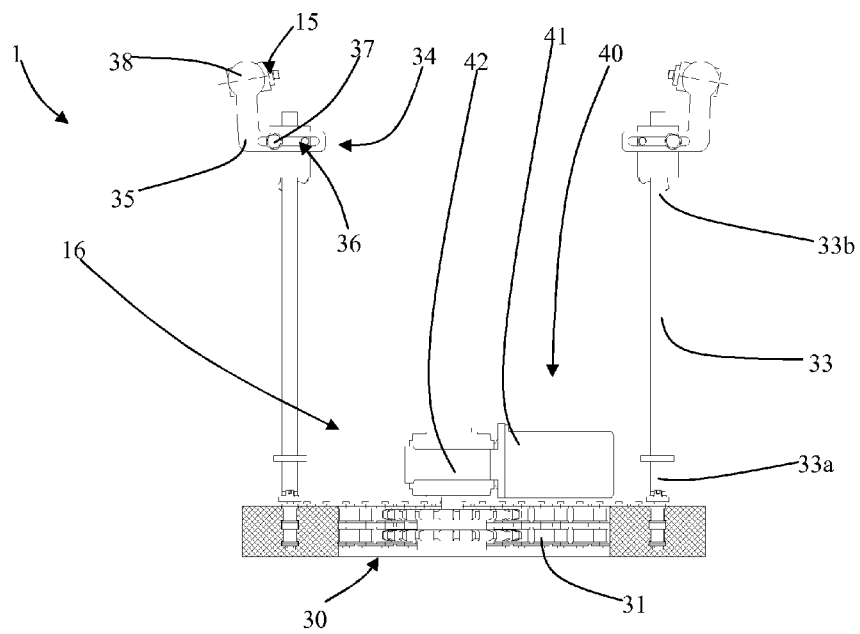
FIG. 9 shows a front view of a fifth embodiment of the device according to this invention.
Figure 10:
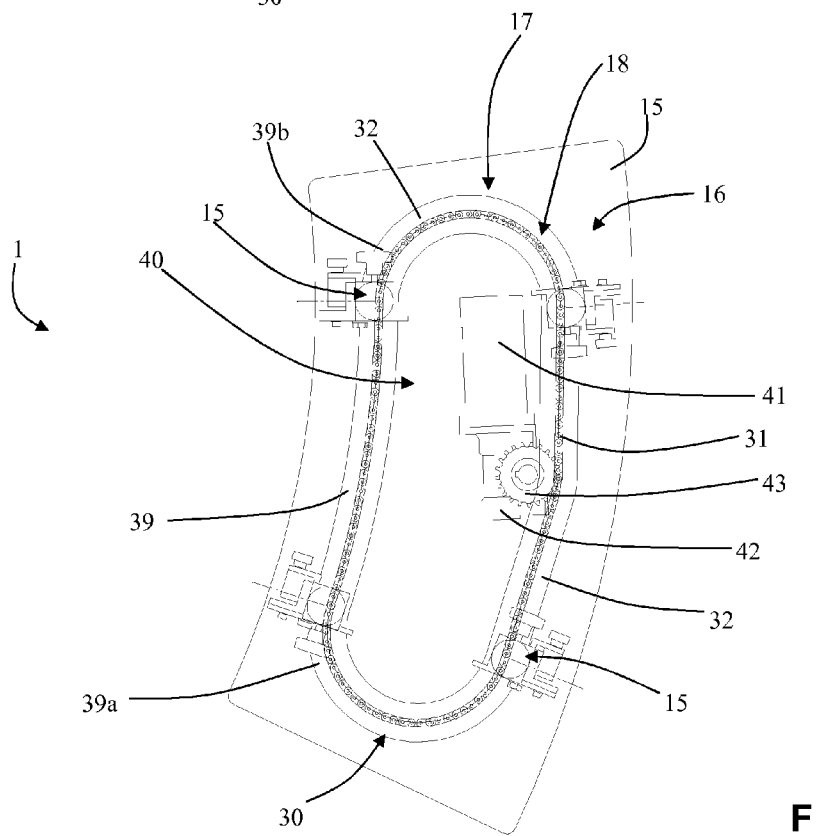
FIG. 10 shows a top view of the fifth embodiment of the device illustrated in FIG. 9.
Figure 11:
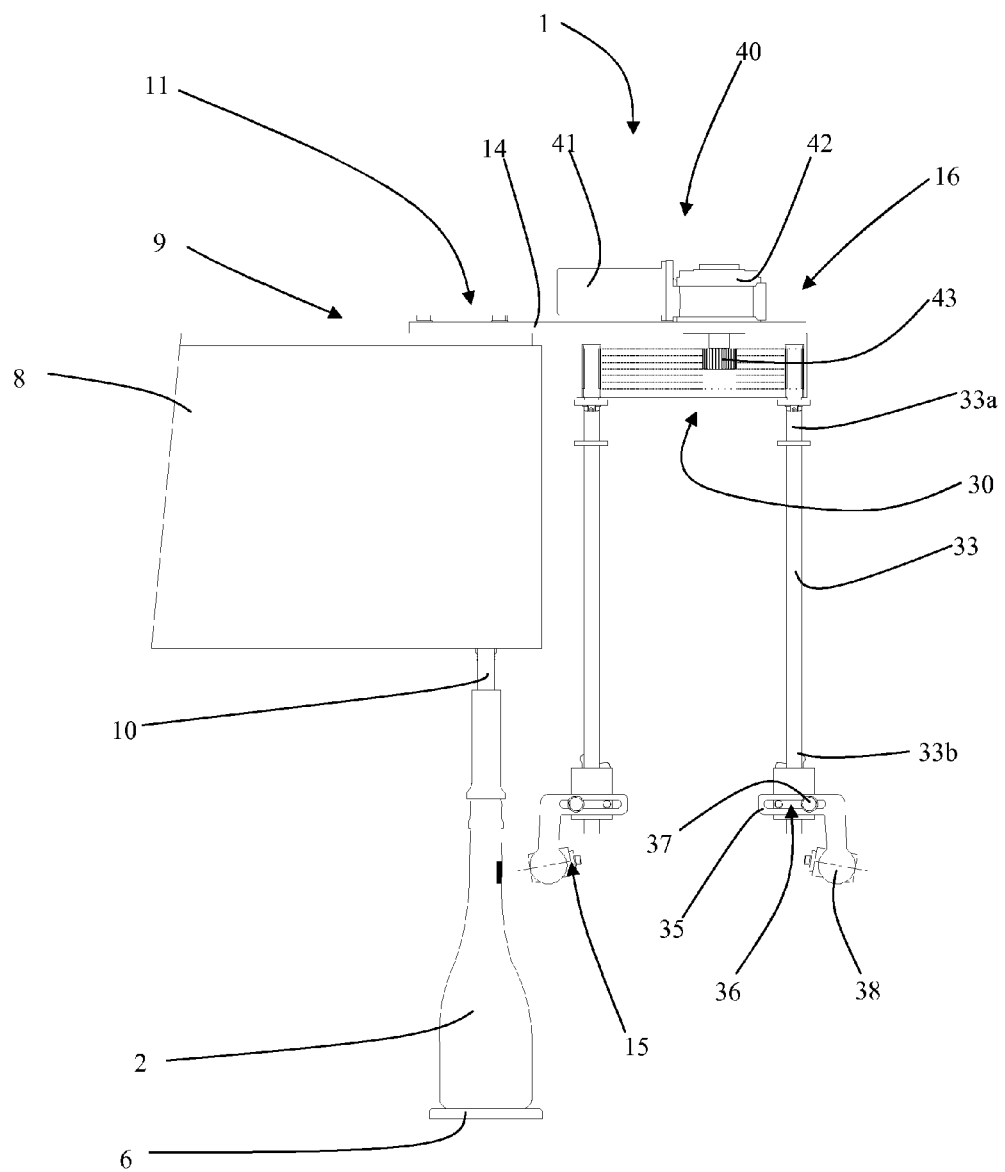
FIG. 11 shows a top view of the fifth embodiment of the device applied to a carousel.

In the embodiment illustrated in FIG. 6, the mobile structure 18 extends mainly inside the outer edge of the carousel 4. Preferably, the mobile structure 18 extends inside the outer edge of the carousel 4.

This invention also relates to a conveyor 3 for containers 2 comprising the detection device 1. Preferably, the conveyor 3 is a conveyor 3 of the rotary carousel type 4 comprising a rotatable carousel 4 of the type described previously.

In addition, this invention relates to a method for detecting containers 2 moving along a feed path of a conveyor 3.

The method comprises a step for positioning a sensor 15 which can be operatively associated to the conveyor 3 and which moves at least between one initial position and one final position. The method comprises moving the sensor 15 from the initial position to the final position in a way which is synchronised with the movement of a container 2. This step of moving the sensor 15 is actuated in such a way that the sensor 15 follows the container 2 as it moves.

Another step comprises detecting a characteristic of a container 2 by means of the sensor 15. Preferably, the characteristic of the container 2 may be a notch, a design in relief, etc.

Lastly, the method comprises returning the sensor 15 to the initial position.

As regards the operation of device 1 according to this invention it may be derived directly from the description above.

More specifically, the device 1 moves the mobile structure 18, and, therefore, the sensor 15, in a synchronised manner with the movement of the carousel 4 on which the device 1 is applied. More specifically, the first sensor 15 is moved in a synchronised manner from the initial position to the final position following the movement of the container 2.

In effect, during the movement of the container 2, the first sensor 15 moves at the same speed as the carousel 4 so as to remain directed towards a container 2 until it reaches the final position.

The control unit then commands the mobile structure 18 to return from the final position to the initial position.

This return from the final position to the initial position is performed in the opposite direction to that of the rotation of the carousel 4 and at a speed (in modulus) not necessarily equal to that of the carousel 4.

The return speed may be greater, in modulus, than the rotation speed of the carousel 4 so as to gain time for the subsequent detections.

Moreover, the sensor 15 may be a contrast sensor 15 or an optical fibre sensor 15 depending on the type of characteristic of the container 2 to be detected.

In every embodiment, the sensor 15 may be, depending on the characteristic of the "spot" to be detected, a contrast sensor 15, an optical fibre sensor 15 or a sensor 15 of another type which is not explicitly mentioned here.

For example, if the "spot" of the container 2 distinguishes itself from the rest of the container 2 by a contrast in colour, a contract sensor is used 15; if, however, the "spot" of the container 2 is in relief relative to the rest of the container 2 an optical fibre sensor is used 15.

This invention fulfils the preset aims.

The detection device for containers has reduced dimensions since it comprises a structure with a single rod and a reduced number of sensors.

Moreover, the detection device for containers facilitates access to the inner areas of the carousel as it is positioned on a side of the carousel and not all around.

Lastly, the detection device for containers has reduced costs as it also allows only one sensor to be used for conveyors with many stations.

The invention claimed is:

1. A device for detecting containers (2) moving along a feed path of a conveyor (A) of a conveyor (3), comprising:
   a support structure (11) which can be associated to the conveyor (3);
   at least one detection sensor (15) connected to the support structure (11) and which is mobile with respect to the support structure (11); the sensor (15) being operatively associated to a container (2) moving along the conveyor (3) so as to detect a characteristic of the container (2);
   means (16) for synchronising the sensor (15) with respect to the container (2), the synchronising means (16) being active on the sensor (15) to move it in such a way that the sensor (15) follows the container (2) along at least one part of the feed path (A) from an initial position to a final position;
characterised in that: the synchronising means (16) comprise a guide (17), fixed to the support structure (11), and a mobile structure (18) slidably mounted on the guide (17); the sensor (15) being fixed to the mobile structure (18) for moving at least from the initial position to the final position; the mobile structure (18) comprising a closed-loop transmission unit (30) to which at least one sensor (15) is connected;
   motor-driven means (40) for moving the mobile structure (18) with respect to the support structure (11).

2. The device according to claim 1, characterised in that the synchronising means (16) move the sensor (15) at least between the initial position and the final position at a speed substantially equal to the feed speed of the containers (2).

3. The device according to claim 1, characterised in that the guide (17), at least from the initial position to the final position, has the same shape as the feed path (A).

4. The device according to claim 3, characterised in that the guide (17) has a circumferential arc shape; the sensor (15) being movable along the circumferential arc.

5. The device according to claim 1, characterised in that the synchronising means (16) move the sensor (15) from the initial position to the final position along a forward trajectory T; the synchronising means (16) moving the sensor (15) from the final position to the initial position along a return trajectory R which is separate from the forward trajectory.

6. The device according to claim 5, characterised in that the guide (17) comprises a plurality of guide rollers (17) rotatably mounted on the support structure (11) and around which the transmission unit (30) is enveloped.

7. The device according to claim 1, characterised in that the transmission unit (30) is a belt or a chain (31) of the closed-loop type.

8. The device according to claim 1, characterised in that the support structure (11) can be positioned on one side of the conveyor (3).

9. The device according to claim 1, characterised in that the mobile structure (18) extends mainly outside the outer edge of the carousel (4).

10. The device according to claim 1, characterised in that the mobile structure (18) extends mainly inside the outer edge of the carousel (4).

11. The device according to claim 1, characterised in that it comprises a trolley (13) on which the support structure (11) is mounted; the trolley (13) being fixable to the conveyor (3).

12. The device according to claim 1, characterised in that it comprises a plurality of sensors (15) spaced apart from each other on part of the feed path (A) at the same distance from each other as the distance between one container (2) and another.

13. A conveyor for containers (2) characterised in that it comprises a detecting device (1) according to claim 1; the conveyor (3) being a carousel (4) of the rotary type.

14. A conveyor for containers (2), the conveyor (3) being a carousel (4) of the rotary type, comprising a detection device (1) for containers (2) moving along a feed path (A) of the conveyor (3), characterised in that it comprises:
   a support structure (11) associated with the conveyor (3) and positioned on a side of the conveyor; the support structure (11) being fixed to a stationary point relative to the rest of the carousel (4);
   at least one detection sensor (15) connected to the support structure (11) and which is mobile with respect to the support structure (11); the sensor (15) being operatively associated to a container (2) moving along the conveyor (3) so as to detect a characteristic of the container (2);
   means (16) for synchronising the sensor (15) with respect to the container (2), the synchronising means (16) being active on the sensor (15) to move it in such a way that the sensor (15) follows the container (2) along at least one part of the feed path (A) from an initial position to a final position; said synchronising means (16) comprising a guide (17), fixed to the support structure (11), and a mobile structure (18) slidably mounted on the guide (17); the sensor (15) being fixed to the mobile structure (18) for moving at least from the initial position to the final position;
   motor-driven means (40) for moving the mobile structure (18) with respect to the support structure (11)
   said mobile structure (18) extending mainly outside the outer edge of the carousel (4).

15. The conveyor according to claim 14, characterised in that the synchronising means (16) move the sensor (15) at least between the initial position and the final position at a speed substantially equal to a feed speed of the containers (2).

16. The conveyor according to claim 14, characterised in that the guide (17), at least from the initial position to the final position, has the same shape as the feed path (A).

17. The conveyor according to claim 16, characterised in that the guide (17) has a circumferential arc shape; the sensor (15) being movable along the circumferential arc.

18. The conveyor according to claim 14, characterised in that the synchronising means (16) move the sensor (15) from the initial position to the final position along a forward trajectory T; the synchronising means (16) moving the sensor (15) from the final position to the initial position along the same trajectory T.

19. The conveyor according to claim 14, characterised in that the mobile structure (18) comprises a closed-loop transmission unit (30) to which at least one sensor (15) is connected.

20. The conveyor according to claim 19, characterised in that the synchronising means (16) move the sensor (15) from the initial position to the final position along a forward trajectory T; the synchronising means (16) moving the sensor (15) from the final position to the initial position along a return trajectory R which is separate from the forward trajectory.

21. The conveyor according to claim 20, characterised in that the guide (17) comprises a plurality of guide rollers (17) rotatably mounted on the support structure (11) and around which the transmission unit (30) is enveloped.

22. The conveyor according to claim 19, characterised in that the transmission unit (30) is a belt or a chain (31) of the closed-loop type.

23. The conveyor according to claim 14, characterised in that it comprises a trolley (13) on which the support structure (11) is mounted; the trolley (13) being, in use, fixable to the rest of the conveyor (3).

24. The conveyor according to claim 14, characterised in that it comprises a plurality of sensors (15) spaced apart from each other on part of the feed path (A) at the same distance from each other as the distance between one container (2) and another.

* * * * *

UNITED STATES PATENT AND TRADEMARK OFFICE
CERTIFICATE OF CORRECTION

PATENT NO. : 8,991,589 B2  
APPLICATION NO. : 13/997942  
DATED : March 31, 2015  
INVENTOR(S) : Simone Marcantoni et al.

Page 1 of 1

It is certified that error appears in the above-identified patent and that said Letters Patent is hereby corrected as shown below:

On the title page item (87), please delete "WO2013/090093" and insert therefor
-- WO2012/090093 --.

Signed and Sealed this
First Day of September, 2015

Michelle K. Lee
*Director of the United States Patent and Trademark Office*